United States Patent [19]

Lee, Jr.

[11] Patent Number: 5,008,314

[45] Date of Patent: Apr. 16, 1991

[54] POLYPHENYLENE ETHER COMPOSITIONS RESISTANT TO ENVIRONMENTAL STRESS CRACKING

[75] Inventor: Gim F. Lee, Jr., Albany, N.Y.

[73] Assignee: General Electric Co., Selkirk, N.Y.

[21] Appl. No.: 454,654

[22] Filed: Dec. 21, 1989

[51] Int. Cl.$^5$ .......................... C08K 5/52; C08L 71/12
[52] U.S. Cl. .................................. 524/143; 524/151; 525/68; 525/132; 525/905
[58] Field of Search .......................... 525/132, 68, 905; 524/143, 151

[56] References Cited

U.S. PATENT DOCUMENTS

| | | | |
|---|---|---|---|
| 3,383,435 | 5/1968 | Cizek | 260/874 |
| 3,819,761 | 6/1974 | Lee | 260/874 |
| 3,976,725 | 8/1976 | Lee | 260/892 |
| 4,341,879 | 7/1982 | Sugio et al. | |
| 4,529,761 | 7/1985 | Lohmeijer | 524/157 |
| 4,647,594 | 3/1987 | de Munck et al. | 521/146 |

Primary Examiner—Jacob Ziegler
Attorney, Agent, or Firm—Joseph T. Eisele; Francis T. Coppa

[57] ABSTRACT

A thermoplastic blend for molding articles with resistance to environmental stress cracking and with good melt flow properties comprises a polyphenylene ether resin having a low intrinsic viscosity and a polystyrene resin having a high intrinsic viscosity. The composition can further contain an impact modifier and/or a flame retardant.

12 Claims, No Drawings

POLYPHENYLENE ETHER COMPOSITIONS RESISTANT TO ENVIRONMENTAL STRESS CRACKING

BACKGROUND OF THE INVENTION

1. Field of the Invention

The invention is directed to novel thermoplastic blends of polyphenylene ether resins and high impact rubber modified polystyrenes with good resistance to environmental stress cracking together with good melt flow characteristics.

2. Brief Description of the Prior Art

Polyphenylene ether resins are high performance, naturally flame retardant, engineering thermoplastics having relatively high melt viscosities and high softening temperatures (generally in excess of 200° C.). However, it has long been recognized that they have a major drawback of not being easily melt processed. To improve moldability and processability polyphenylene ether resins have been blended with polystyrene resins, particularly high impact polystyrene resins such as the rubber modified graft copolymers of styrene on butadiene-based elastomers. Such blends are disclosed, for example, by Cizek (to General Electric Co.), U.S. Pat. No. 3,383,435 (1968).

Blends of polyphenylene ethers with styrenic polymers, especially high impact polystyrene, have been found extremely useful and are major compositions of commerce. However, improvements are desired in regard to stress cracking of articles molded from these resin blends. Stress cracking is the most frequently occurring failure mode which imposes an upper limit on service life of the molded articles. This failure mode occurs when microcracks are initiated in regions of the article where the local stress exceeds a critical stress level. A microcrack can propagate and become a macroscopic failure.

It is further known that in the presence of certain chemicals, fuels, oils and solvents, the critical stress level is appreciably reduced, thus causing increased potential for stress cracking. Such induced stress cracking is called environmental stress cracking (ESC). An example is the ESC of plastic refrigerator claddings caused by the fluorochlorocarbon blowing agent residues in the polyurethane foam insulation. Another situation where ESC is a problem is in automotive applications; ESC sensitized by gasoline or oils has prevented use of a number of polyphenylene ether resins where the plastic would otherwise be useful.

Various means have been sought to overcome ESC. We have already disclosed in U.S. Pat. Nos. 3,819,761 (1974) and 3,976,725 (1976) that improved ESC resistance may be achieved by use of high intrinsic viscosity, rubber-modified polystyrenes in a polyblend with a polyphenylene ether resin. However, since such blends have inherently high viscosities, they are difficult to process.

Another method for attempting to overcome ESC is to add an alkylsulfonate, as taught by Lohmeijer (to General Electric Co.), U.S. Pat. No. 4,529,761 (1985), or an alkylsulfonate together with a vinylaromaticdiene block copolymer, as taught by de Munck et al. (to General Electric Co.), U.S. Pat. No. 4,647,594 (1987). However, the use of such an additional component adds mixing complications which are undesirable.

It is one object of the present invention to obtain polyphenylene ether resin containing molding compositions having good melt flow (good moldability) along with improved environmental stress cracking resistance, without suffering loss of the other useful and characteristic properties of polyphenylene ether-impact polystyrene blends such as good impact strength and processability.

I have now found that a combination of improved melt flow along with improved environmental stress crack resistance, and generally other desirable physical properties, can be achieved by means of polyphenylene ether-polystyrene blends wherein low intrinsic viscosity polyphenylene ether and very high intrinsic viscosity polystyrene is used to prepare the blend.

SUMMARY OF THE INVENTION

The present invention comprises a thermoplastic resin blend for molding articles with resistance to environmental stress cracking and having improved flow properties, which comprises, in homogeneous admixture (a) from about 5 to about 95 (preferably from about 25 to about 70) weight percent of a polyphenylene ether resin having an average intrinsic viscosity below about 0.4 (preferably below about 0.35); and (b) from about 95 to about 5 (preferably from about 75 to about 30) weight percent of a polystyrene resin having an average intrinsic viscosity above about 0.85 (preferably above about 0.90). Intrinsic viscosity values given herein are determined by measurement in chloroform at 25° C.

In preferred embodiments of the invention, the compositions further comprise the presence of an impact modifier and/or a flame retardant.

In the above summary of the invention and in the following detailed description, intrinsic viscosity is used as the characterizing descriptor of the critical properties of the components in preference to molecular weight, although it will be evident to those skilled in the polymer art that intrinsic viscosity and molecular weight are related. Intrinsic viscosity is, however, an objectively measured property whereas molecular weight is inferred from this or other measured properties and is thus less exactly known for most polymers.

The intrinsic viscosity values given herein were determined by measurement in chloroform at 25° C.

DETAILED DESCRIPTION OF THE INVENTION

The polyphenylene ether (oxide) resin component for use in preparing the compositions of the invention are members of a well known class of resins. Examples of polyphenylene ether resins and processes for their preparation can be found in U.S. Pat. Nos. 3,306,874, 3,306,875, 3,257,357 and 3,257,358, all of which are incorporated herein by reference thereto.

A further description of the polyphenylene ether resins is given by Aycock and Shu (General Electric Co.), U.S. Pat. No. 4,824,887 (1989), col. 2 line 40 to col. 5 line 23, incorporated herein by reference thereto. The preferred polyphenylene ether resins are those made from 2, 6-dimethylphenol, and falling within the intrinsic viscosity range herein before specified as necessary to the present invention.

The polyphenylene ethers (also known as polyphenylene oxides) described above are polymer chains which comprise a plurality of recurring structural units having the formula

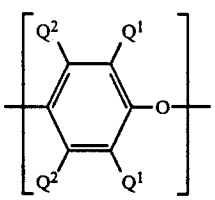
(I)

In each of the units I independently, each $Q^1$ is independently halogen, primary or secondary lower alkyl (i.e. alkyl containing up to 7 carbon atoms), phenyl, haloalkyl, aminoalkyl, hydrocarbonoxy, or halohydrocarbonoxy, wherein at least two carbon atoms separate the halogen and oxygen atoms; and each $Q^2$ is independently hydrogen, halogen, primary or secondary lower alkyl, phenyl, haloalkyl, hydrocarbonoxy, or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2, 3-dimethylbutyl, 2-, 3-, or 4-methylpentyl, and the corresponding heptyl groups. Examples of secondary lower alkyl groups are isopropyl, sec-butyl, and 3-pentyl. Preferably, any alkyl radicals are straight chain rather than branched. Most often, each $Q^1$ is alkyl or phenyl, especially $C_{1-4}$ alkyl and each $Q^2$ is hydrogen.

Both homopolymer and copolymer polyphenylene ethers are included. Suitable homopolymers are those containing, for example, 2, 6-dimethyl-1, 4-phenylene ether units. Suitable copolymers include random copolymers containing such units in combination with (for example), 2, 3, 6-trimethyl-1, 4-phenylene ether units. Many random copolymers, as well as homopolymers, are disclosed in the patent literature as mentioned above.

Also included are polyphenylene ethers containing structural moieties which modify properties such as molecular weight, melt viscosity, and/or impact strength. Such polymers are described in the patent literature and may be prepared by grafting onto the polyphenylene ether in a known manner vinyl monomers such as acrylonitrile and vinyl aromatic compounds (e.g. styrene), or such polymers as polystyrenes and elastomers. The product typically contains both grafted and ungrafted moieties. Other representative polymers are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are the low molecular weight polycarbonates, quinones, heterocycles and formals.

The polyphenylene ethers as a broad class have number average molecular weights within the range of about 3000–40,000 and a weight average molecular weight of about 20,000–80,000, as determined by gel permeation chromatography. Their intrinsic viscosity as a broad class is typically in the range of about 0.1–0.7 dl./g. as measured in chloroform at 25° C. However, for purposes of the present invention it is necessary that the intrinsic viscosity of the polyphenylene ether be below about 0.4 and preferably below about 0.35. These values refer to the intrinsic viscosity of the total polyphenylene ether (PPE) added into the composition of the invention. Those skilled in the art of polymer compounding will recognize that a mixture of two PPE grades or batches may be conveniently used. If such a mixture is used, it is necessary that the weighted average of the intrinsic viscosity of the mixture be below the above-stated upper limits for intrinsic viscosity. By weighted average is meant the average computed by summing the weight fraction of the first PPE grade or batch times its intrinsic viscosity plus the weight fraction of the second PPE grade or batch times its intrinsic viscosity.

The polyphenylene ethers are typically prepared by the oxidative coupling of at least one corresponding monohydroxyaromatic compound. Particularly useful and readily available monohydroxyaromatic compounds are 2, 6-xylenol (wherein each Q1 is methyl and each $Q^2$ is hydrogen), whereupon the polymer may be characterized as a poly(2, 6-dimethyl-1, 4-phenylene ether), and 2, 3, 6-trimethylphenol (where each $Q^1$ and one $Q^2$ is methyl and the other $Q^2$ is hydrogen).

A variety of catalyst systems are known to promote the preparation of polyphenylene ethers by oxidative coupling. There is no particular limitation as to catalyst choice and any of the known catalysts can be used. For the most part, they contain at least one heavy metal compound such as a copper, manganese, or cobalt compound, usually in combination with various other materials.

A first class of useful catalyst systems generally used consists of those containing a copper compound. Such catalysts are disclosed, for example, in U.S. Pat. Nos. 3,306,874, 3,306,875, 3,914,266, and 4,028,341, all of which are incorporated herein by reference thereto. They are usually combinations of cuprous or cupric ions, halide (i.e. chloride, bromide, or iodide) ions, and at least one amine.

Catalyst systems containing manganese compounds constitute a second useful class. They are generally alkaline systems in which divalent manganese is combined with such anions as halide, alkoxide, or phenoxide. Most often, the manganese is present as a complex with one or more complexing and/or chelating agents such as dialkylamines, alkanolamines, alkylenediamines, o-hydroxyaromatic aldehydes, o-hydroxyazo compounds, omega-hydroxyoximes (monomeric and polymeric), o-hydroxyaryl oximes, and beta-diketones. Also useful are known cobalt-containing catalyst systems. Suitable manganese and cobalt-containing catalyst systems for polyphenylene ether preparation are known in the art by reason of disclosure in numerous patents and publications.

Polyphenylene ethers may be used in the present invention having various end groups including those disclosed in U.S. Pat. No. 4,806,297 which is incorporated herein by reference thereto. The molecular weight of polyphenylene ethers may be kept low by producing such end groups, or by foreshortening the polymerization.

The polystyrene resin used as a component in the compositions of the present invention are generally well known as are methods of their preparation. They may be made from styrene itself or any of its homologs and analogs suitable for use in styrene polymerization, and particularly compounds of the formula

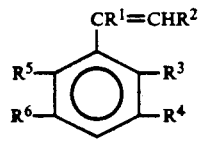

(II)

wherein $R^1$ and $R^2$ are each selected from the group consisting of lower alkyl or alkenyl groups of from 1 to 6 carbon atoms and hydrogen; and $RR^3$, $R^4$, $R^5$, and $R^6$ are each selected from the group consisting of bromo, chloro, hydrogen, and lower alkyl or alkenyl groups of from 1 to 6 carbon atoms. Examples of the compounds of formula (II) include alphamethylstyrene, para-methylstyrene, 2, 4-dimethylstyrene, chlorostyrene, bromostyrene, dibromostyrene, tribromostyrene, p-tert-butylstyrene and para-ethylstyrene. If desired, a minor amount of non-styrenic comonomer can be included, for example, acrylonitrile or maleic anhydride.

The polystyrene component of the compositions of the invention may also be in whole or part, a rubber-modified polystyrene, also known as a high-impact polystyrene (HIPS). Such HIPS materials are made by graft polymerization of a styrenic monomer with pre-formed rubbers, such as polybutadienes, polyisoprenes, styrene-butadiene copolymers, ethylene-propylene copolymers, ethylene-propylenediene terpolymers, polyacrylates, and the like. Conventionally, such HIPS compositions contain about 4 to about 30 weight percent of the rubber component, based on the total weight of the polystyrene plus the rubber. Methods for producing both the polystyrene and the HIPS component are known in the art and are described in many patents and publications, for example in U.S. Pat. No. 4,824,887, incorporated herein by reference thereto. The necessary property required for the polystyrene (or the HIPS) for use as a component in the present invention is that it have an intrinsic viscosity of at least 0.85 and preferably above about 0.90. This corresponds to a relatively high molecular weight. Where the polystyrene component is a high impact polystyrene, the intrinsic viscosity requirement refers to the soluble portion, essentially the styrenic portion; the rubber portion often being crosslinked and insoluble in the solvent used to determine intrinsic viscosity.

The high intrinsic viscosity polystyrene component for the compositions of the present invention may be made by the same general means as polystyrenes in general, but the amount of chain transfer agent and chain terminators is kept very low or absent, so as to favor production of the high intrinsic viscosity resins.

Means for obtaining high molecular weight polystyrenes having the requisite high intrinsic viscosity are well known; see my U.S. Pat. Nos. 3,819,761 and 3,976,725, incorporated herein by reference thereto.

In one advantageous embodiment of the invention, the polystyrene component of the requisite high intrinsic viscosity is of a non-HIPS type, i.e. a so-called "crystal" polystyrene not having the rubber moiety. It is used along with a further resin component which is an impact modifier. The impact modifier is used in an effective amount (typically from about 1 to about 30% by weight of the non-rubber polystyrene component). The impact modifier may be an elastomeric polyphenylene ether compatible impact modifier. Such impact modifiers include various elastomeric copolymers which are substantially the same as those rubbers described above for use in making HIPS. Some further examples are carboxylated ethylene-propylene rubbers, block copolymers of various alkenylaromatic compounds such as styrene with polymerizable olefins or dienes, including butadiene, isoprene, chloroprene, ethylene, propylene and butylene, and core-shell elastomers containing, for example, a poly(alkyl acrylate) core attached to a polystyrene shell via an interpenetrating network. Such core-shell elastomers are more fully discussed in U.S. Pat. No. 4,681,915. Amongst preferred impact modifiers are block (typically diblock, triblock or radial teleblock) copolymers of alkenyl aromatic compounds and dienes, optionally hydrogenated, such as the D and G series of block copolymers made by Shell Chemical Company under the trademark KRATON.

It will be evident to one skilled in the art that a HIPS containing a suboptimal amount of an impact modifier may be used, supplemented by a separately added impact modifier. In general, whether the impact modifier is added as part of a HIPS component (b) or separately it will be present in effective amounts, which range from about 4 to about 30 weight percent of the non-rubber polystyrene component.

The blends of the invention may be further modified by the addition of other additives known to the art of plastics compounding. Such additives include fillers (such as clay or talc), reinforcing agents (such as glass fibers), other resins, plasticizers, flow promoters and other processing aids, stabilizers, colorants, mold release agents, flame retardants, antistats, antioxidants, ultraviolet screening agents, and the like.

One particularly advantageous embodiment of the invention is the subclass of blends of (a) and (b) which further contain an effective amount of a flame retardant. The prior art blends of polyphenylene oxides and styrenic polymers when modified by a flame retardant would, if the retardant was present in amounts above its compatibility level, exhibit exudation of some of the flame retardant (which could in some cases aggravate environmental stress cracking). The present invention makes available blends which are more tolerant of flame retardants such as triaryl phosphates, tert-butylphenyl diphenyl phosphate or isopropylphenyl diphenyl phosphate, and are less prone to stress cracking even if some exudation happens to occur. The aforementioned triaryl phosphates also serve as plasticizers and aid in processing. An effective amount of such flame retardants is about 1 to 15% by weight of the total formulation.

The compositions of the invention may be prepared by homogeneously mixing or blending components (a) and (b) by any of the conventional means known for the blending of thermoplastic resins. For example blending in a kneading machine such as a Banbury mixer, Werner Pfleiderer blender, or in an extruder, or by means of a roll mill. The sequence of addition is not critical but the components should be thoroughly blended together at an effective temperature at which the ingredients flux sufficiently so as to become well blended. The blending operation can be conducted in a batchwise or continuous manner.

The compounded composition can be extruded and cut up, if so desired, into granules, pellets, and the like by standard techniques. The further processing of the compounded compositions can be carried out by conventional molding, forming or extrusion processes well known in the art.

The following examples describe the manner and process for carrying out the invention and set forth the best mode contemplated by the inventor but are not to be construed as limiting.

A series of blends were made by dry blending followed by further mixing and extruding in a twin screw extruder using polyphenylene ethers (PPO) of two different intrinsic viscosities, high-impact polystyrene of the typical intrinsic viscosity range usually used in such blends, and for comparison, a high-impact polystyrene made using a very high rubber HIPS blended with crystal polystyrene of two different intrinsic viscosities. The extruded plastic was chopped and injection molded to make test bars. The ESC tests were done using 1% strain applied by a jig and a diphenyl t-butylphenyl phosphate fluid (Stauffer 71B) as the crack-provoking medium. The time for cracks to appear visually was noted. Flexural modulus was determined according to ASTM test method D-790. Flow channel length was determined by the spiral mold method. Results are shown in Table 1 below:

TABLE 1

| Example No. | 1 | 2 | 3 | 4 | 5 | 6 |
| --- | --- | --- | --- | --- | --- | --- |
| Composition (wt. %) | | | | | | |
| PPO ® 0.46IV[1] | 35 | 20 | 20 | 20 | 35 | 35 |
| PPO ® 0.19IV[2] | — | 15 | 15 | 15 | — | — |
| HIPS[3] | 65 | 65 | — | — | — | — |
| High rubber HIPS[4] | — | — | 30 | 30 | 30 | 30 |
| PS Dylene ® 8G Hi MW[5] | — | — | 35 | — | 35 | — |
| PS Huntman 203 Med MW[6] | — | — | — | 35 | — | 35 |
| K-1101[7] | — | — | 5 | 5 | — | — |
| Polyethylene | 1.5 | 1.5 | 1.5 | 1.5 | 1.5 | 1.5 |
| Stabilizer[8] | 0.8 | 0.8 | 0.8 | 0.8 | 0.8 | 0.8 |
| Properties: | | | | | | |
| Av. time to crack[9] | 42 | 37 | 56 | 17 | 45 | 22 |
| Flex modulus[10] | 312 | 306 | 294 | 293 | 321 | 324 |
| Flow channel length[11] | 23 | 27 | 27 | 28 | 23 | 24 |

Notes:
[1] A poly(2,6-dimethyl-1,4-phenylene ether) of intrinsic viscosity 0.46 corresponding approximately to a number average molecular weight of about 20,000; General Electric Company.
[2] As 1 but a very low intrinsic viscosity (i.v. 0.19), corresponding approximately to a molecular weight of 5800; General Electric Company.
[3] Huntsman 1897, a HIPS of intrinsic viscosity 0.81.
[4] A high rubber content impact polystyrene, the soluble portion of which has an intrinsic viscosity of 0.59.
[5] A high intrinsic viscosity polystyrene, i.v. about 1.1, number average molecular weight about 114,600, weight average molecular weight about 294,500 as measured by gel permeation chromatography.
[6] A medium intrinsic viscosity polystyrene, i.v. 0.9, number average molecular weight about 71,700, weight average molecular weight about 200,000 as measured by gel permeation chromatography.
[7] Styrene-butadiene-styrene block copolymer, Shell Chemical Company.
[8] Stabilizer mixture consisting of tridecyl phosphite, zinc sulfide, and zinc oxide.
[9] In minutes; average of two test bars.
[10] In Kpsi as measured by ASTM D-790.
[11] In inches, as measured by the spiral mold method.

These results show that as the intrinsic viscosity of the polystyrene was raised, the ESC was alleviated, but flow was reduced somewhat. However, when low intrinsic viscosity PPO ® was included with high intrinsic viscosity PS, good ESC resistance along with good flow was obtained.

Another series of tests was run using very high intrinsic viscosity HIPS, and in this case the stress cracking was initiated at 1% strain in mineral spirits. Results are shown in Table 2 below:

TABLE 2

| Example No. | 7 | 8 | 9 |
| --- | --- | --- | --- |
| Composition (wt. %) | | | |
| PPO ® 0.46IV[1] | 50 | 35 | 35 |
| PPO ® 0.25IV[2] | — | 15 | 15 |
| HIPS (regular)[3] | 50 | 50 | — |
| VHMW HIPS[4] | — | — | 50 |
| PE[5] | 1.5 | 1.5 | 1.5 |
| Stabilizer[6] | 0.8 | 0.8 | 0.8 |
| Properties | | | |
| Av. time to crack | 6 min. | 10–15 sec. | 10–15 min. |
| Flow channel length[7] | 25.0 | 28.7 | 27.7 |

Notes:
[1] A poly(2,6-dimethyl-p-phenylene ether) made by General Electric Co. having intrinsic viscosity of 0.46 corresponding to molecular weight of about 20,000.
[2] A poly(2,6-dimethyl-p-phenylene ether) made by General Electric Co. having intrinsic viscosity of 0.25 corresponding to molecular weight of about 8,000–9,000.
[3] A high impact polystyrene, Huntsman 1897, comprising 10% of a rubber of the polybutadiene type in a matrix of a styrene homopolymer partly grafted onto the rubber; melt index 2.7, intrinsic viscosity 0.81.
[4] A high impact polystyrene, Huntsman code no. T1119, comprising 10.7% of a rubber of the polybutadiene type in a matrix of polystyrene of intrinsic viscosity of 0.97.
[5] A polyethylene of the linear low density type used as processing aid.
[6-7] As in previous table.

These data show that high intrinsic viscosity HIPS blended with very low intrinsic viscosity PPO ® gives very good resistance to ESC together with good flow and impact properties.

What is claimed is:

1. A thermoplastic resin blend for molding articles with resistance to environmental stress cracking and having improved melt flow properties, which comprises, in homogeneous admixture
    (a) from about 5 to about 95 weight percent of a polyphenylene ether resin having an average intrinsic viscosity below about 0.4; and
    (b) from about 95 to about 5 weight percent of a polystyrene resin having an average intrinsic viscosity above about 0.85.

2. A thermoplastic blend with improved resistance to environmental stress cracking and improved flow properties, which comprises:
    (a) from about 25 to about 70 weight percent of a polyphenylene ether resin having an average intrinsic viscosity below about 0.4; and
    (b) from about 75 to about 30 weight percent of a polystyrene resin having an average intrinsic viscosity above about 0.85.

3. A thermoplastic blend with improved resistance to environmental stress cracking and improved flow properties, which comprises:
    (a) from about 5 to about 95 weight percent of a polyphenylene ether resin having an average intrinsic viscosity below about 0.35; and
    (b) from about 95 to about 5 weight percent of a polystyrene resin having an average intrinsic viscosity above about 0.90.

4. A composition of claim 1 wherein said polyphenylene ether resin comprises a plurality of recurring structural units of the formula:

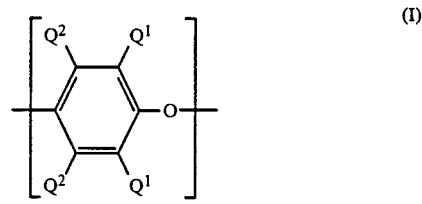

wherein, in each of said units independently, each $Q^1$ is independently selected from halogen, primary lower alkyl, secondary lower alkyl, phenyl, haloalkyl, aminoalkyl, hydrocarbonoxy and halohydrocarbonoxy, wherein at least two carbon atoms separate the halogen and oxygen atoms; and each $Q^2$ is independently hydrogen, halogen, primary lower alkyl, secondary lower alkyl, phenyl, haloalkyl, hydrocarbonoxy, or halohydrocarbonoxy as defined for $Q^1$.

5. The composition of claim 4 wherein each $Q^1$ is an alkyl group having from 1 to 4 carbon atoms and each $Q^2$ is hydrogen.

6. A composition of claim 1 wherein said polyphenylene oxide is derived principally from 2, 6-dimethylphenol.

7. A composition of claim 1 wherein said polyphenylene oxide is a copolymer derived principally from 2, 6-dimethylphenol and 2, 3, 6-trimethylphenol.

8. A composition of claim 1 which further comprises an effective amount of an impact modifier.

9. A composition of claim 1 wherein said polystyrene resin is a high impact polystyrene of which the soluble portion has an intrinsic viscosity of above about 0.85.

10. A composition of claim 1 wherein said polystyrene resin consists substantially of a high impact high rubber content polystyrene and a crystal polystyrene of high intrinsic viscosity such that the weighted average of the intrinsic viscosity of both said polystyrenes is above about 0.85.

11. A composition of claim 1 which further comprises an effective amount of a flame retardant.

12. A composition of claim 11 wherein said flame retardant is a triaryl phosphate.

* * * * *